(12) United States Patent
Jans et al.

(10) Patent No.: US 10,409,537 B2
(45) Date of Patent: Sep. 10, 2019

(54) REPROGRAPHIC APPARATUS COMPRISING A USER INTERFACE GENERATING DEVICE AND METHOD THEREFOR

(71) Applicant: Océ Holding B.V., Venlo (NL)

(72) Inventors: Jozef T. J. M. Jans, Venlo (NL); Nithin R. A. Shenoy, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/178,954

(22) Filed: Nov. 2, 2018

(65) Prior Publication Data

US 2019/0073174 A1 Mar. 7, 2019

Related U.S. Application Data

(63) Continuation of application No. PCT/EP2017/060476, filed on May 3, 2017.

(30) Foreign Application Priority Data

May 11, 2016 (EP) .................................... 16169133

(51) Int. Cl.
*G06F 3/12* (2006.01)
*G06F 9/4401* (2018.01)
(Continued)

(52) U.S. Cl.
CPC .......... *G06F 3/1268* (2013.01); *G06F 3/1205* (2013.01); *G06F 3/1228* (2013.01);
(Continued)

(58) Field of Classification Search
CPC .... G06F 3/1205; G06F 3/1228; G06F 3/1253; G06F 3/1285; G06F 9/453; G06F 3/1258;
(Continued)

(56) References Cited

U.S. PATENT DOCUMENTS

| | | | | |
|---|---|---|---|---|
| 2007/0256020 | A1* | 11/2007 | Haga | H04N 1/4406 715/741 |
| 2009/0296119 | A1* | 12/2009 | Kurihara | B41J 13/0036 358/1.9 |
| 2009/0313541 | A1* | 12/2009 | Dan | G06F 3/1207 715/273 |

FOREIGN PATENT DOCUMENTS

EP   2 031 500 A1   3/2009

OTHER PUBLICATIONS

International Search Report, issued in PCT/EP2017/080476, dated Aug. 4, 2017.

(Continued)

*Primary Examiner* — Saeid Ebrahimi Dehkordy
(74) *Attorney, Agent, or Firm* — Birch, Stewart, Kolasch & Birch, LLP

(57) ABSTRACT

A reprographic controller for providing reprographic commands to a reprographic engine has a reprographic setting. The reprographic controller includes a communication device for communicating with a computing device running a device driver; and user interface screen generator connected to the communication device. The user interface screen generator is arranged to generate and return a user interface screen including a user interface widget for setting the reprographic setting upon receiving a user interface screen request through the communication device from the device driver. The reprographic controller is further arranged to: receive from the device driver through the communication device: a value for the reprographic setting; and a reprographic job. The reprographic controller further includes a job processing device for processing the reprographic job taking into account the received value for the reprographic setting.

18 Claims, 7 Drawing Sheets

(51) Int. Cl.
*H04N 1/44* (2006.01)
*G06F 9/451* (2018.01)
*H04N 1/00* (2006.01)

(52) U.S. Cl.
CPC .......... *G06F 3/1253* (2013.01); *G06F 3/1258* (2013.01); *G06F 3/1285* (2013.01); *G06F 9/4411* (2013.01); *G06F 9/453* (2018.02); *H04N 1/00413* (2013.01); *H04N 1/4406* (2013.01)

(58) Field of Classification Search
CPC . G06F 3/1268; G06F 9/4411; H04N 1/00413; H04N 1/4406
USPC ........................................................ 358/1.15
See application file for complete search history.

(56) References Cited

OTHER PUBLICATIONS

Written Opinion of the International Searching Authority, issued in PCT/EP2017/060476, dated Aug. 4, 2017.

\* cited by examiner

REPROGRAPHIC APPARATUS COMPRISING A USER INTERFACE GENERATING DEVICE AND METHOD THEREFOR

CROSS REFERENCE TO RELATED APPLICATIONS

This application is a Continuation of PCT International Application No. PCT/EP2017/060476, filed on May 3, 2017, which claims priority under 35 U.S.C. 119(a) to patent application Ser. No. 16/169,133.2, filed in Europe on May 11, 2016, all of which are hereby expressly incorporated by reference into the present application.

FIELD OF THE INVENTION

The present invention generally pertains to a user interface for specifying job settings for reprographic jobs.

The present invention further pertains to a device generating such a user interface. Furthermore, the present invention pertains to a method for the generation of such a user interface, as well as a computer program product implementing such a method.

BACKGROUND ART

Modern operating systems (OSs) come with build in support for reprographic devices such as printers, scanners, facsimile machines, multi-functional devices (these combine two or more functions of the former and usually also of copiers). Many software applications rely on this OS support for providing print, scan, and facsimile services. Especially for printing this is the case. Nowadays, the only software applications not relying on such OS support, either do not provide such services, for example, you cannot print directly from the application, or are specialised applications such as dedicated print job submitters which often function only with a limited number of device models.

The more generic applications typically make use of device drivers, such as printer drivers, to make use of these services. These device drivers may still be application specific, but in general these device drivers are installed on the system level in the OS in order to provide their services to a wide range of applications.

These device drivers are mainly responsible for two tasks:
1) Translating between a device independent graphics format and a device specific graphics format.
2) Translating generic device commands into device specific device commands understood by the specific device supported by the driver, and vice versa translating messages (for example status messages) received from the device into platform (OS) specific messages.

For example, an application may internally use a generic graphics format such as JPEG or some proprietary format and use the OS's print API to call API specific draw commands. These draw commands are typically not understood by a printer. It is a printer driver that translates these draw commands into specific printer "draw commands", which is called the "print data". In most modern electrophotography and inkjet printers these specific printer draw commands are in the form of a page or document specification in a Page Description Language (PDL) that is understood by the specific printer model (i.e. the PDL is the specific graphics format understood by the printer. Furthermore, the printer driver is responsible for translating settings the user is making (such as duplex printing, n-up printing) into job settings that are typically gathered in a job ticket. Finally, the print data and the job ticket are sent by the printer driver to the printer using the appropriate device specific device commands.

A disadvantage of the known architecture is that the device drivers are device specific. Of course this is by nature. It is the responsibility of the device driver to translate between a generic environment provided by the host OS and the device specific environment implemented in the specific device. However, this also means that as soon as anything changes with regard to the specification of the print data or the device commands, the device driver needs to reflect those changes. This means for example, that even if a company only has a single printer, and the printer firmware is upgraded providing some additional functionality, the printer drivers of all workstations that wish to print to this printer, require updating. Furthermore, if printers are employed of multiple printer models, every device model requires a specific device driver.

Although this disadvantage relates both to changes in the specification of the print data as well as the device commands, the former is nowadays mostly standardised in more-or-less stable PDL specifications. Therefore, inhere we will only address the latter.

The problem of requiring new device drivers when device capabilities change has been partially addressed in the prior art by introducing a mechanism for the device and the device driver to send a list of device capabilities from the device to the device driver allowing the device driver to adapt to changes in the devices capabilities. Although an improvement, this solution is still beyond ideal as these device capabilities are specified to the driver as a setting identifier such as a name, with corresponding acceptable values for the setting. This means that the device driver usually has no understanding of the meaning of these settings or the acceptable values, at least not for settings that were not foreseen when the device driver was written. It therefore just acts as a pass-through between the user and the device. It is up to the user to interpret the settings and the corresponding values.

The object of the present invention is to overcome or mitigate these drawbacks of the prior art.

SUMMARY OF THE INVENTION

According to a first embodiment of the present invention, a reprographic controller is provided for providing reprographic commands to a reprographic engine, wherein the reprographic controller has a reprographic setting. The reprographic controller comprises: a communication device for communicating with a computing device running a device driver; and user interface screen generation means connected to the communication device, the user interface screen generation means arranged to generate and return a user interface screen comprising a user interface widget for setting the reprographic setting upon receiving a user interface screen request through the communication device from the device driver. The reprographic controller is further arranged to receive from the device driver through the communication device: a value for the reprographic setting; and a reprographic job. The reprographic controller further comprises a job processing device for processing the reprographic job taking into account the received value for the reprographic setting.

According to a further embodiment of the present invention, a computing device is provided comprising: a non-volatile memory having stored thereon a device driver for submitting a reprographic job to a reprographic controller, and a communication device for communicating with such reprographic controller. The computing device comprises or is connectable to: a display and an input device for receiving user input. The device driver is arranged to: request, by means of the communication device from the reprographic controller, a screen, the screen comprising a user interface widget for setting a reprographic setting; in response to the request, receive the screen; display on the display, the screen comprising the user interface widget; receive, by means of the input device, a user input representing a value for the reprographic setting; sending the value through the communication device to the reprographic controller; and submitting the reprographic job to the reprographic controller.

The computing device is a workstation for submitting jobs to the reprographic controller and/or controlling the reprographic controller. The invention comprises two cooperating parts, at the one hand the reprographic controller that is aware of the reprographic settings for processing reprographic jobs, and at the other hand, the printer driver running on the workstation and comprising user interface rendering means to render a user interface on a display of the workstation to allow a user to set settings in accordance with the reprographic settings of the reprographic controller.

According to again a further embodiment of the present invention a reprographic apparatus is provided comprising such reprographic controller and further comprising a reprographic engine for physically performing the reprographic task and arranged to execute the reprographic tasks on the reprographic engine under the control of the reprographic controller.

The reprographic engine is responsible for physically performing the specific reprographic tasks. For example, in the case of the reprographic apparatus being a printer, the reprographic engine is the print engine comprising the image forming unit that is responsible for depositing marking material such as ink or toner on media, and a media conveying system for conveying the media to, along, and from the image forming unit. The print engine may comprise further hardware such as a duplex unit for turning the media to print on the other side of the media. In the case of a (dedicated) scanner the reprographic engine is the scan engine comprising the digitisation unit (for example a line CCD) for sampling and digitising an image moved along the digitisation unit. Furthermore, the scan engine comprises media conveying means for moving the media to, along, and from the digitisation unit. The reprographic controller is responsible for controlling and orchestrating all actions in the reprographic engine.

In some embodiments, typically smaller apparatuses such as desktop printers and walk-up printers, the reprographic controller and the reprographic engine form a single apparatus comprised in a single casing or alternatively multiple cases attached to each other to form a single physical unit. However, in alternative embodiments, typically larger production printers, the reprographic engine and the reprographic controller are physically separate units connected through a network connection or a dedicated communication cable.

According to a further embodiment of the present invention, a reprographic system is provided for executing reprographic jobs comprising: such reprographic controller or such reprographic apparatus; and such computing device. The invention requires adaption of two co-operating components: the printer driver in the computing device that no longer has a built-in specification of the printer driver user interface (for example in the form of code for generating the user interface), but instead code to request the reprographic controller to send such a specification; and the reprographic controller that should be responsive to the request of the printer driver by compiling a specification of the printer driver user interface dependent on the printer capabilities (hardware and software capabilities).

One particular problem solved by the invention is the lack of consistency between the look-and-feel of a user interface of a device driver for a specific device model and the look-and-feel of a Local User Interface (LUI) as available at a local operating panel of a device of the specific model. Because the printer driver user interface is actually generated by the reprographic controller, the reprographic controller may use the same logic for generating the user interface of the printer driver as for generating the LUI resulting in an identical or at least similar look-and-feel of the two user interfaces.

According to one aspect of the present invention a method is provided for submitting a reprographic job comprising reprographic data from a computing device to a reprographic controller, the reprographic controller having a reprographic setting, the method comprising the steps of: sending a user interface screen request to the reprographic controller; receiving a user interface screen from the reprographic controller, the screen comprising a user interface widget for setting the reprographic setting; displaying the screen with the widget on a display comprised in or connected to the computing device; receiving user input with regard to the displayed widget representing a value for the reprographic setting; communicating the value to the reprographic controller; and submitting the reprographic job to the reprographic controller.

According to a further aspect of the present invention a method is provided wherein the value for the reprographic setting is set in a job ticket and wherein the value is communicated to the reprographic controller by sending the job ticket comprising the value to the reprographic controller.

According to an alternative aspect of the present invention a method is provided wherein the user interface screen comprises a plurality of user interface widgets for setting a plurality of reprographic settings, and the value for each reprographic setting is communicated directly to the reprographic controller upon manipulation of the corresponding widget by the user.

According to another aspect of the present invention a method is provided for use in a reprographic controller having a reprographic setting, the method for providing a user interface comprising a screen through a device driver, the method comprising the steps of: receiving a user interface screen request from a device driver running on a computing device; generating the user interface screen comprising the user interface widget for setting the reprographic setting; sending the screen to the device driver; receiving a value for the reprographic setting from the device driver; receiving a reprographic job from the device driver; and processing the reprographic job taking into account the value for the reprographic setting.

According to a further aspect of the invention a method is provided wherein the value for the reprographic setting is received comprised in a job ticket.

Typically the printer driver will temporarily store the reprographic settings made in the printer driver window. After the user has closed the printer driver window and thereafter activated the print button in the print dialog, the printer driver compiles the temporarily stored reprographic settings (possibly overridden by settings made afterwards in the print dialog) into a job ticket and sends the job ticket together with the print data in the appropriate PDL to the printer.

According to an alternative aspect of the invention a method is provided wherein the user interface screen comprises a plurality of user interface widgets for setting a plurality of reprographic settings, and the value for each reprographic setting is individually received by the reprographic controller and upon reception set in a job ticket.

Typically, with each widget, code is associated that sends a value set through the widget to the reprographic controller. The code may be associated through value-change event handlers. A typical example is using AJAX calls in a web application to send changed reprographic settings to the reprographic controller to set appropriate settings in the job ticket.

In another aspect of the invention a computer program product is provided embodied on a non-transitory computer readable medium that, if executed on a processor, performs the steps of any of these methods.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF THE DRAWINGS

Figure 1:
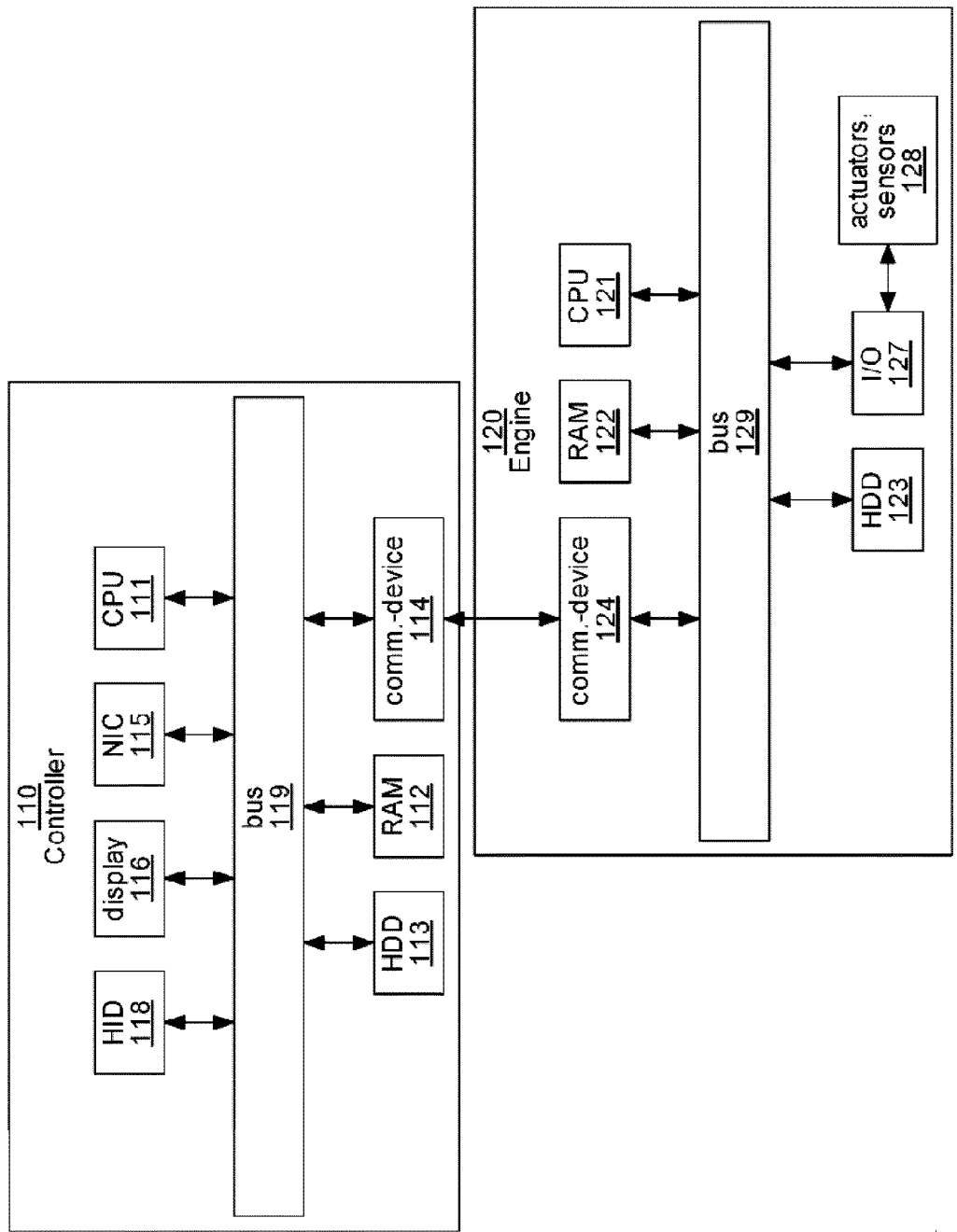
FIG. 1 is a block diagram showing the components of a general printer to which the invention may be applied.

The present invention will now be described with reference to the accompanying drawings, wherein the same reference numerals have been used to identify the same or similar elements throughout the several views.

A typical reprographic apparatus (FIG. 1) such as a printer generally comprises a controller 110 and an engine 120.

The engine 120 is responsible for low-level control of the apparatus. It deals with individual hardware components that are responsible for the reprographic process such as drives for media transport, media detectors (in the media path as well as in the input and output media trays), path switches, fusers, print heads, etc.; in general actuators and sensors 128. These actuators and sensors are connected through input/output (I/O) boards 127 to a bus 129. The bus 129 connects the major components in the engine 120. Actual data processing takes place in a central processing unit (CPU) 121. The CPU 121 reads sensor values from the sensors 128 through the I/O 127. Based on these sensor values and other data such as print data and print commands received from the controller 110, the CPU 121 determines how the engine 120 should respond to this information and determines appropriate actuation values that are sent through the I/O 127 to the actuators 128. The engine 120 comprises a volatile memory such as a random access memory (RAM) 122 to temporarily store data for processing such as the print data and print commands received from the controller 110, and the sensor values read from the sensors 128. Furthermore, a non-volatile memory such as a hard disk drive (HDD) 123 serves to store data in a more permanent manner, for example to survive a power down of the system. This hard disk drive 123 typically also stores embedded software comprising computer instructions that are run on the CPU 121. The engine 120 typically runs a real-time Operating System (RTOS), for example a soft real-time Operating System in order to deal with the time critical functions of controlling the actuators 128. The engine 120 further comprises a communication device 124 to communicate with the controller 110. Typically, the engine 120 receives print data and print commands from the controller 110 and provides back status information on the engine 120 itself and on the processing of the print commands and print data, including sending error messages to the controller 110.

The controller 110 is connected to the engine 120 through a communication device 114 that communicates with the communication device 124 of the engine 120. These communication devices 114, 124 may, for example, be implemented as ethernet network interface controllers (NIC). Processing in the controller 110 is done by a CPU 111 that is connected to all the other components in the controller 110 through a bus 119. The data to be processed is temporarily stored in a volatile memory such as RAM 112, while data is stored in a more permanent manner in a non-volatile memory such as hard disk drive 113, for example in order to survive power downs, but also to relieve the volatile memory 112 which typically has a smaller storage size. The hard disk drive 113 typically stores print jobs, each comprising print data and a job ticket. Furthermore, the hard disk drive 113 comprises converted print data which is print data converted to a format suitable for processing by the engine 120. Typically the converted print data comprises raster images. Converting the print data in the print jobs to converted print data is typically done in a Raster Image Processor (RIP). Although the RIP may be a dedicated hardware device, it is common to be implemented in software and running on CPU 111. As the RIP-process is rather computationally intensive, it is common for controllers 110 to have multiple processing units in the form of a multi-core CPU 111 or multiple CPUs 111. The controller 110 further comprises a display 116 to show messages to an operator, or display a complete graphical user interface (GUI) to an operator for operating the reprographic apparatus. The display 116 is supplemented by a human interface device (HID) 118 such as a keyboard, mouse, touchpad, stylus, or touch sensitive panel integrated into display 116, and allows the operator to operate the reprographic apparatus. The controller 110 further comprises a network interface card (NIC) 115 to connect the controller 110 to a computer network. Through the network connection, print jobs may be submitted to the controller 110 and the results of scan jobs may be retrieved from the controller 110. Furthermore, the network connection may be used to remotely operate the reprographic apparatus, monitor its status, and send production data to monitoring systems, accounting systems, or business information systems. Note that in smaller printer models, specifically printers suitable for placement on desks, it is common to use communication interfaces such as USB, FireWire, or Bluetooth instead of the NIC 115.

The controller 110 and the engine 120 may be implemented in a single printer device (typical for smaller printers for low volume printing), or as two separate, but interconnected devices (typical for larger high-volume production printers).

The engine 120 typically deals with print data on a sheet level, swath level, or even line level. The engine 120 is typically not aware of information on a document or even job level. In contrast the controller 110 typically receives print jobs comprising one or more documents, the documents typically comprising multiple pages.

Figure 2:
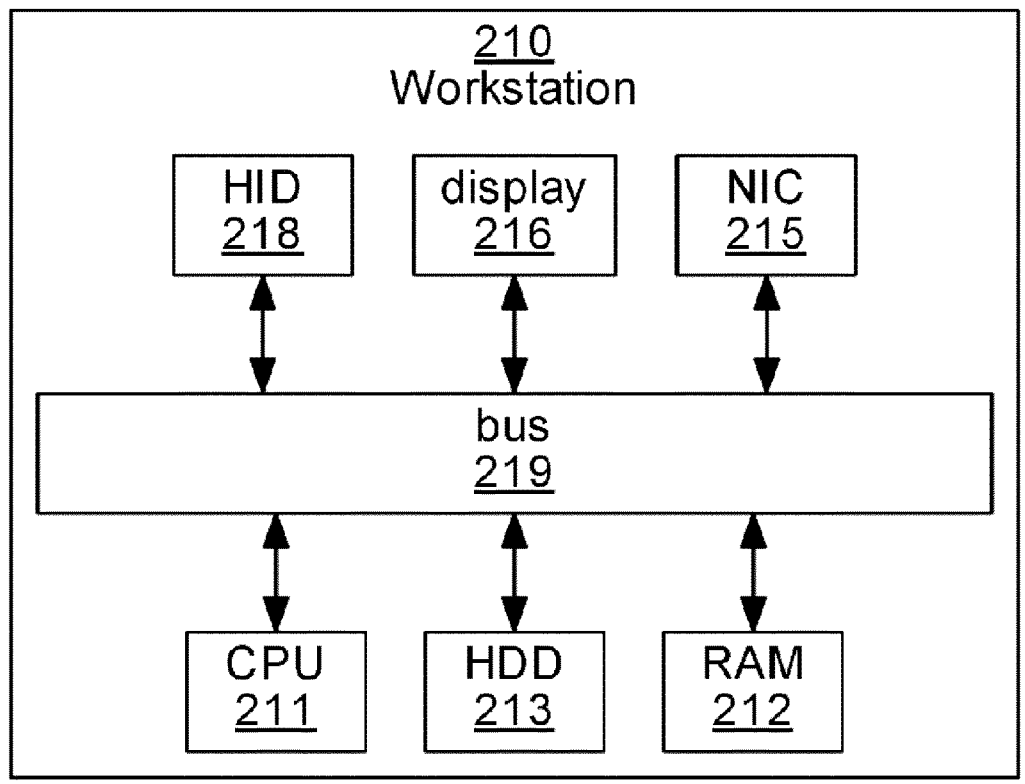
FIG. 2 is a block diagram showing the components of a general purpose computer whereupon an embodiment of the invention may be installed.

Print jobs are typically sent to the printing system from user workstations. The users may be end-users (such as office workers), or in print production environments, reprographic workers, pre-press workers, etc. The workstations are typically general purpose computers, such as personal computers (PC). A workstation 210 (FIG. 2) typically comprises a CPU 211 for processing data. Data is temporarily stored in a volatile memory such as RAM 212. Data is stored in a permanent form in a non-volatile memory such as a hard disk drive 213 or solid state drive. The non-volatile memory further comprises system software such as an operating system (OS) and application software. The application software is executed on the CPU 211 under the control of the OS that also executes on the CPU 211. The CPU 211 is connected to the RAM 212 and the HDD 213 as well as the other components through a bus 219. The workstation 210 further comprises a display 216 to display information to the user. Typically the OS runs a Graphical User Interface (GUI) to present information from the OS and the software applications to the user and to allow the user to manipulate data through the support of a Human Interface Device (HID) 218, such as a mouse, keyboard, trackpad, or a touch sensitive layer in the display 216. Furthermore, the workstation 210 typically comprises a Network Interface Card (NIC) 215 to communicate through a computer network with other devices. Typically, the NIC 215 allows connections between the workstation 210 and a controller 110 of a printing system. Such connections may be used for submitting print jobs from the workstation 210 to the controller 110, but also to monitor or even operate the controller 110 and through the controller 110, the engine 120, remotely from the workstation 210.

Print jobs are submitted from a workstation 210 such as a client device 330 (FIG. 3) over a network 340 to a printer 310, 320. In order to be able to do this, the client device 330 needs to have a printer driver 332 installed (typically in the OS, although software applications 331 may have their own printer drivers). Traditionally, the printer driver 332 comprises a UI Module 334 that is responsible for generating a user interface comprising a window with widgets that allows the user to interact with the printer driver 332 and set job settings such as the media to print on, simplex/duplex printing, number of copies, etc. These settings correspond to capabilities of the printer 310, 320 the printer driver 332 is developed for.

Figure 4:
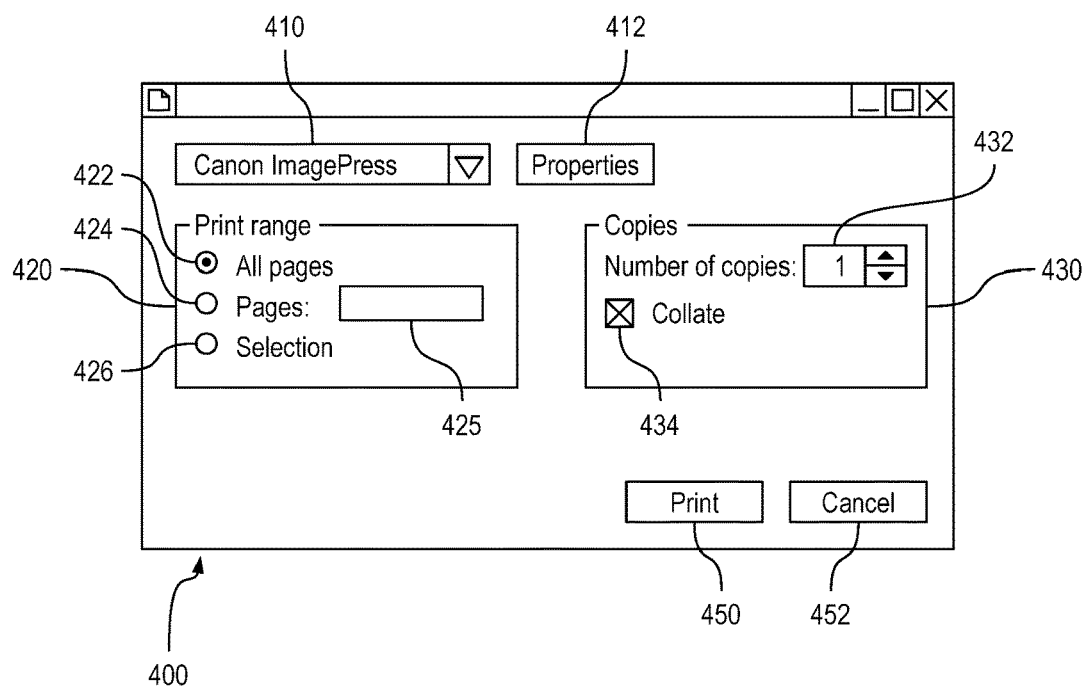
FIG. 4 is a diagram showing a typical print dialog that would invoke a device driver according to the invention.

The user interface of the printer driver 332 is typically invoked by first selecting an appropriate print button, or print menu item in the user interface of an application window of an application 331. This opens an application specific window 400 (FIG. 4) allowing for some settings, for example number of copies 432, collate printing 434, selection of what to print 420, such as "print selection" 426, print specific pages 424, print all pages 422, print slides versus print slide notes, etc. This window is commonly called the "print dialog" 400. It is application specific though.

One of the settings typically provided in this window 400 is a printer selection list 410, usually in the form of a drop-down list for selecting a printer to print to. The printers listed in this list are the printers for which there is support in either the application 331 itself or, typically, indirectly by means of the OS, and for which an appropriate printer driver 332 is installed. In addition to this drop-down list there usually is a properties-button 412. When this properties-button 412 is selected, the printer driver 332 of the printer selected in the drop-down list 410 is invoked and the printer driver 332 displays its own user interface with a printer driver window 500 (FIG. 5) comprising widgets to set the job settings.

The widgets may comprise typical user interface widgets such as buttons, radio buttons, check boxes, drop-down lists, frames, tabs, spin boxes, etc. Selectable and settable widgets correspond to job settings, for example media specific settings 510 such as media size 512, media orientation (portrait 514 versus landscape 515), and simplex 516 versus duplex 517 printing; binding settings 520 such as binding method "stapling" 522 and binding side (long edge 524 and short edge 525); and copy settings 530 such as number of copies 532 and copy collating 534.

This window 500 and the corresponding widgets are generated by the UI module 334 of the prior art printer driver 332. The UI module 334 is responsible for generating widgets for all the settings that the user may set for the print job, such as colour versus black & white, simplex 516 versus duplex 517, n-up printing, binding edge 524, 525, stapling 522, media type 512, media orientation 514, 515, halftoning, print quality, etc. By manipulating the widgets, the user selects the desired settings. Once the user is finished, he will close the printer driver window 500, for example by means of an Ok-button 550, and the printer driver 332 temporarily stores the settings. A Cancel-button 552 is usually provided to discard the job settings made (and revert to previously set job settings if present or alternatively default job settings).

The user returns to the print dialog 400 of the application 331. The print dialog 400 might give some options that coincide with the settings provided to him in the printer driver window 400, for example, often a user may set the number of copies 532 in the printer driver window 500, but also in the print-dialog 400. Once the user hits the Print-button 450, the printer driver 332 picks up again. The Rendering Module 336 of the prior art printer driver 332 will translate the "draw commands" defined in the print-API into print data in the PDL understood by the particular printer model. The job ticket generation module 338 will translate the settings selected in the printer driver window 500 and the print-dialog 400 into a job ticket. Finally, the print data and the job ticket are sent over the network 340 to the printer 310, 320.

Figure 6:
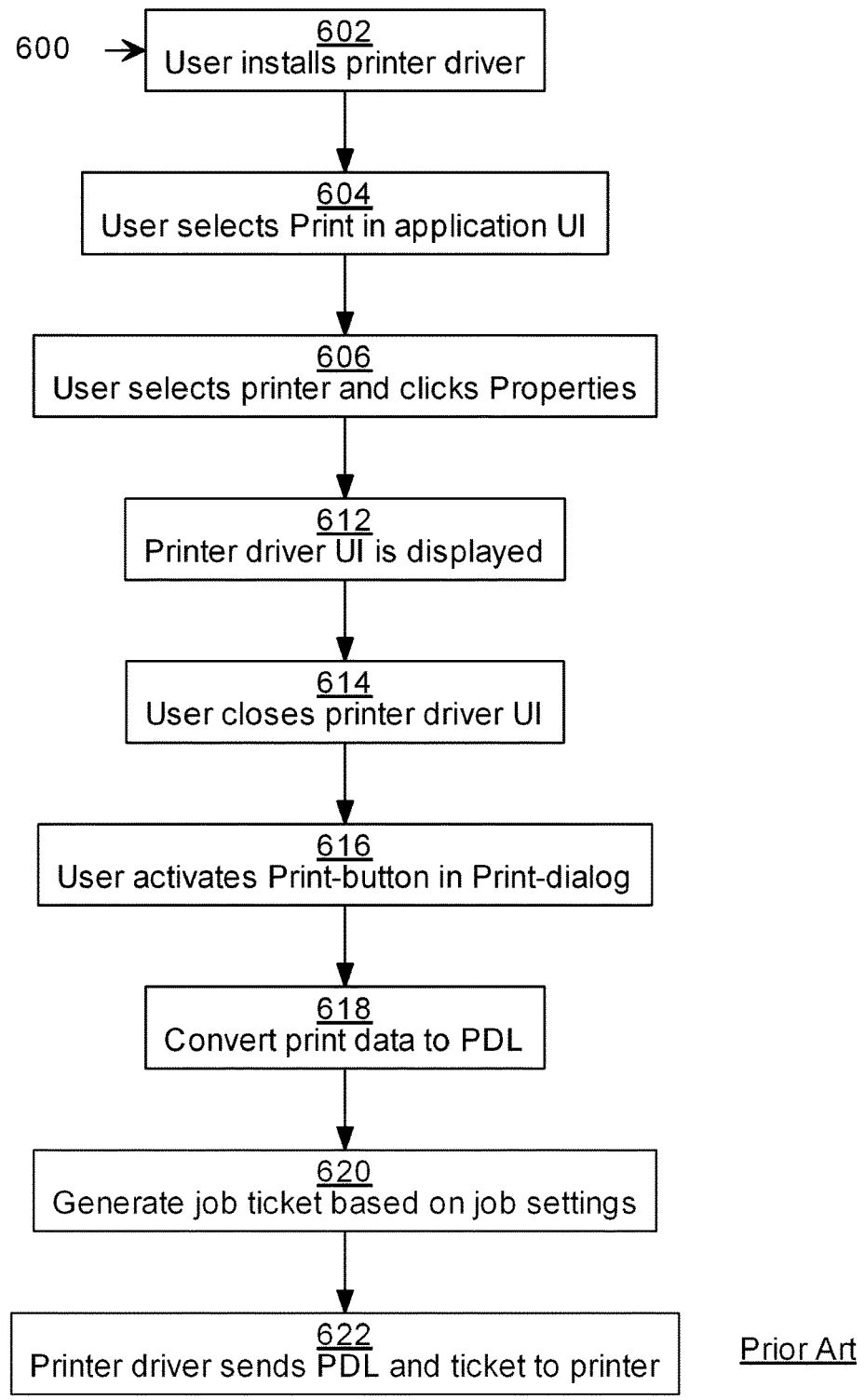
FIG. 6 is a flow diagram showing a prior art method.

A typical prior art workflow 600 that allows printing from a workstation is depicted in FIG. 6. The workflow starts with the user installing 602 a printer driver 332 that is specifically suitable for a particular printer model. After the printer driver 332 has been installed, the user is able to initiate printing from within an application that supports printing through the printer driver 332. (Typically the application 331 supports the OS' specific print-API and the printer driver 332 implements this print-API.) In the application 331, the user selects 604 "Print" from the application menu (typically located in the File-menu) in the application UI, or activates a Print-button from a toolbar in the application UI. This typically brings up an application specific print-dialog 400. In the print-dialog 400, the user selects the correct printer 310, 320 if it is not already selected by default and clicks 606 the Properties-button 412. The printer driver 332 will now show 612 the printer driver window 500 by means of its UI Module 334. The printer driver window 500 comprises a collection of widgets, such as radio boxes, check boxes, drop-down boxes, tabs, buttons, etc. to allow the user to enter printing settings for, for example simplex 516 versus duplex 517, colour versus black & white, number of copies 532, binding 520, punching, collating 534, etc. Once the user is done making all the necessary settings, he closes 614 the printer driver window 500 by clicking an Ok-button 550. On closing the window, the printer driver 332 temporarily stores the settings made. The user may make further settings in the print-dialog 400 of the application 331, if he has not already done so, such as specifying what to print 420 (whole document 422, selection 426, specific page ranges 424). Note that some settings may be available through both the printer driver window 500 as well as the print-dialog 400. In case of conflicting settings, it is up to the printer driver 331 to favour the one or the other. When the user activates 616 the print-button 450 in the print-dialog 400, the printer driver 332 proceeds by converting 618 the data to be printed into the PDL supported by the printer model the printer driver 332 is designed for by means of the Rendering Module 336. Furthermore, the Job Ticket Generation Module 338 generates 620 a job ticket based on the settings temporarily stored by the printer driver 332 after the printer driver window 500 was closed and the settings done in the print-dialog 400 of the application 331. When the print data has been converted into PDL and the job ticket has been generated, the printer driver 332 sends 622 the print data and the job ticket to the printer 310, 320. Although the step of installing the printer driver 602 is depicted as a single step, it comprises several sub-steps, such as obtaining the latest version of the drivers by browsing to the website of the manufacturer of the printer 310, 320 and downloading the latest driver, starting the installation of the driver, and usually several dialogs to click through before the actual installation starts.

The problem addressed by the invention is that when a printer is upgraded, either through new hardware or through a firmware update, new functionality available in the printer 310, 320 is not available until a new printer driver 332 has been installed. So the user is forced to go through the whole installation procedure of the printer driver 332 again. This problem is aggravated by the fact that this procedure has to be repeated for every user that needs to print from his workstation 210 to the printer 310, 320.

Figure 3:
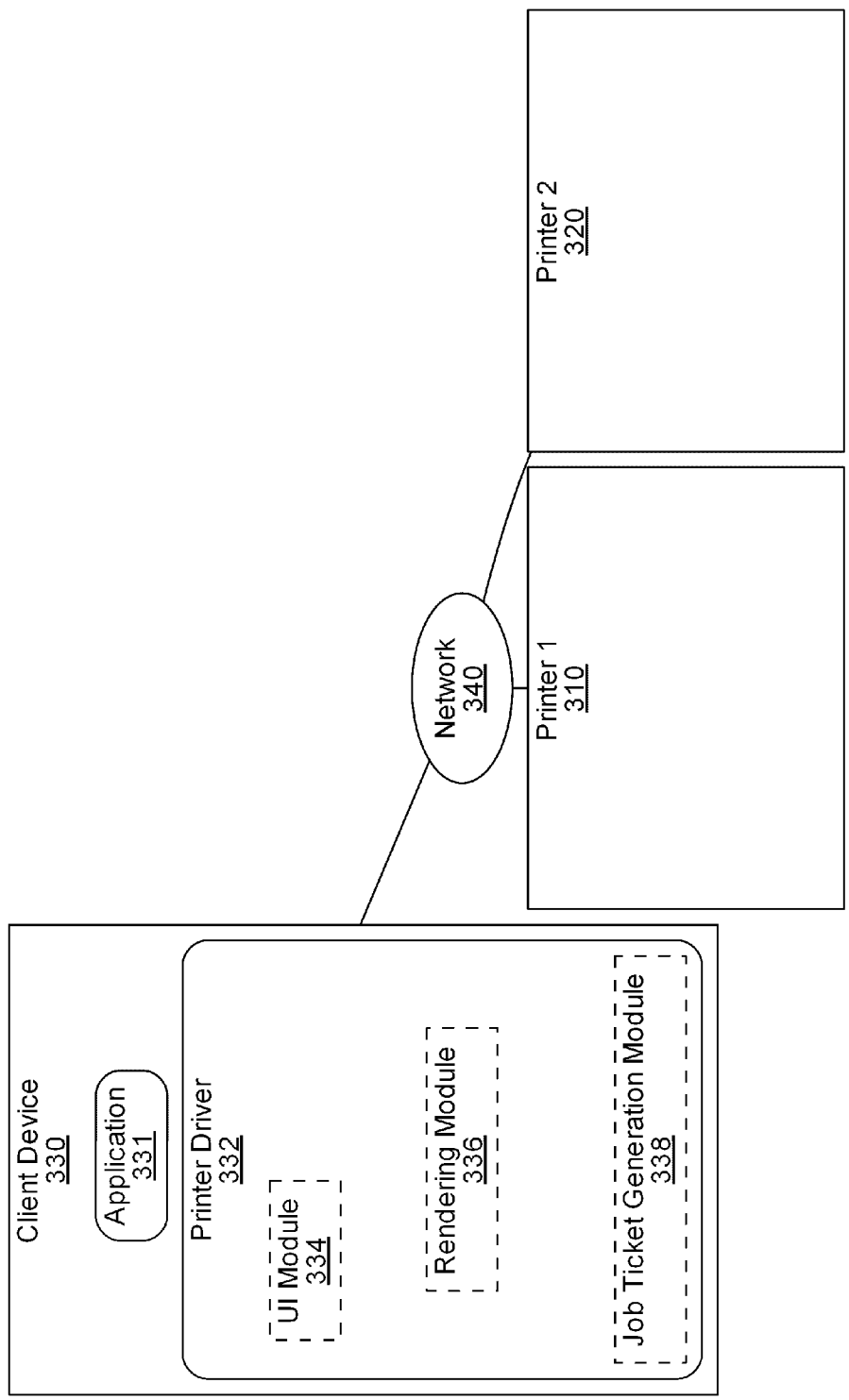
FIG. 3 is a block diagram showing an architectural overview of a prior art system.
Figure 7:
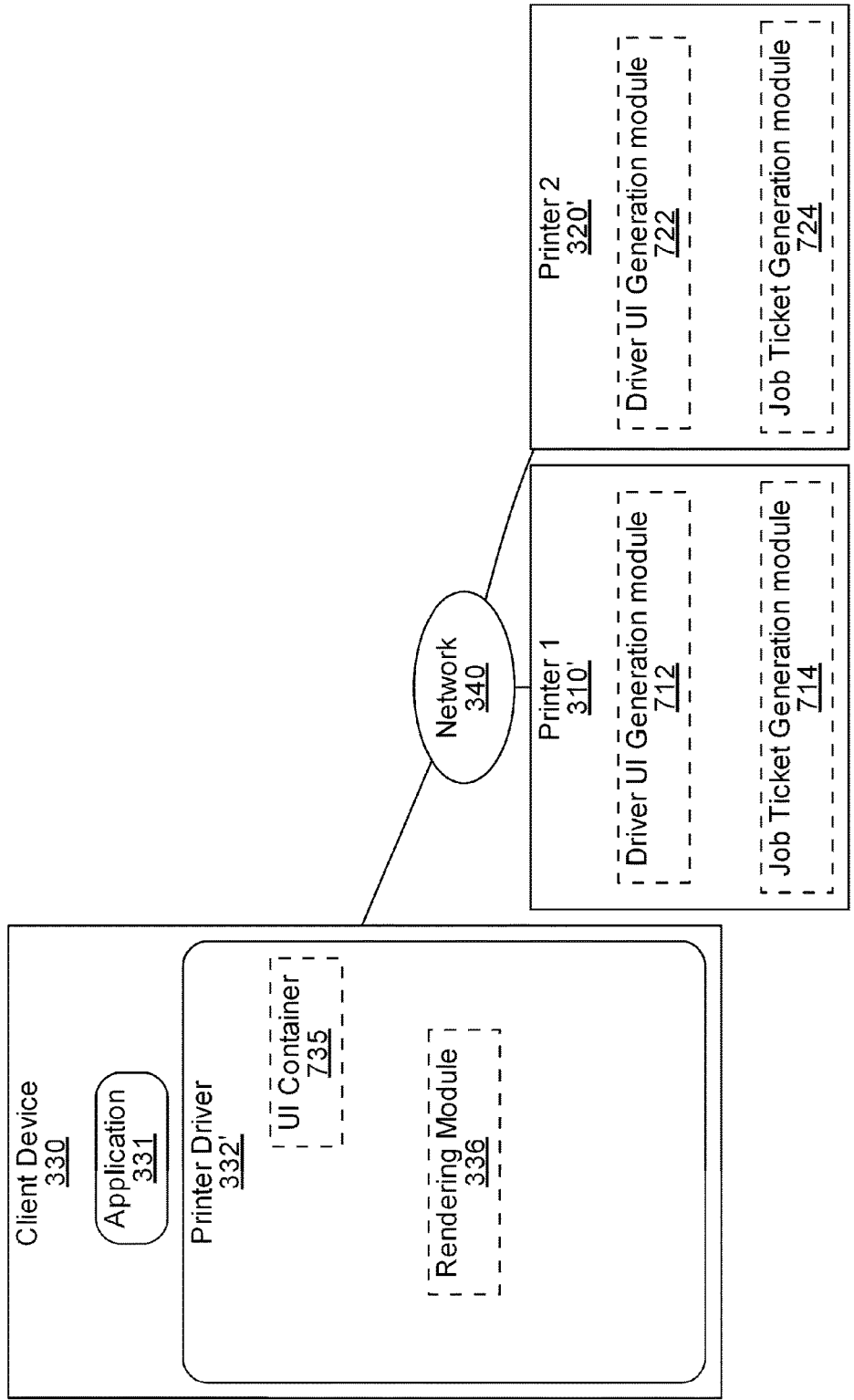
FIG. 7 is a block diagram showing an architectural overview of the present invention.

FIG. 7 shows a block diagram similar to FIG. 3. It shows an implementation according to the present invention. The client device 330 installs a modified (compared to the prior art) printer driver 332'. Instead of the UI Module 334, the modified printer driver 332' comprises a UI Container 735. Where the prior art UI Module 334 is a pre-coded user interface comprised in the printer driver 332, responsible for generating the printer driver window 500 with its corresponding widgets, the UI Container 735 of the present invention is a component of the printer driver 332' that comprises code for generating a user interface (UI) according to a specification that is not pre-coded in the printer driver 332'. Instead, the specification of the user interface (typically a single printer driver window 500 with a number of widgets such as radio buttons, check buttons, drop-down boxes, etc.) is provided by the printer 310', 320', and specifically the printer 310', 320' that the printer driver 332' will submit the print job to. The printer 310', 320' comprises a Driver UI Generation module 712, 722 that is responsible for generating the specification of the user interface of the printer driver 332'. The Driver UI Generation module 712, 722 is responsible for generating a UI specification taking into account the actual capabilities and properties of the printer 310', 320'. The UI specification is sent by the printer 310', 320' to the UI Container 735 of the Printer Driver 332'. The UI Container 735 takes the UI specification and generates the windows and widgets as specified by the UI specification received from the printer 310', 320'.

The UI may comprise a single window or multiple windows. The specification for the different windows may be sent combined in a single UI specification, or in separate specifications, for example for each window a separate specification (basically a window specification), or any other separation such as specifications per tab. If there are separate specifications for separate UI components (windows, tabs, etc.), they may each be sent on demand only, or pre-fetched based on a current window shown, or on predicted user actions, or even all pre-fetched unconditionally.

By receiving the UI specification from the printer 310', 320', the printer driver 332' is capable of producing a printer driver UI that specifically suits the printer 310', 320' and its properties and capabilities even if the printer 310', 320' has been upgraded either by hardware replacement or by firmware upgrade, without any need for changes in the printer driver 332'.

In a particular embodiment, the Driver UI Generation module 712, 722 uses a web server and the UI is specified by means of HTML code being served by the printer 310', 320' to the printer driver 332'. The functionality may be further enriched by means of CSS style sheets and JavaScript scripts creating a web application being hosted at the printer 310', 320'. The printer driver 332' receives the HTML code and optional CSS and JavaScript (both either embedded in the HTML code or as separate URI's referenced by the HTML code) and renders it locally at the client device 330 to display the UI of the printer driver 332'.

Once the user has completed making desired adjustments to the job settings in the printer driver window 500 and selects the printer driver window Ok-button 550, printer 310', 320' sends a job ticket with the proper job settings to the printer driver 332'. This job ticket is not necessarily the final version of the job ticket, as the user still has the option to change a limited number of job settings through the application's print dialog 400.

As soon as the user selects the print-button 450 in the application's print dialog 400, all job settings have become final (disregarding the possibility for a printer operator to adjust job settings once more through the local or remote user interface of the printer 310', 320'). The Rendering module 336 of the printer driver 332' will translate the "draw commands" defined in the print-API into print data in the form of the PDL understood by the particular printer model. The printer driver 332' will submit the thus generated print data and the job ticket to the printer 310', 320'.

Figure 5:
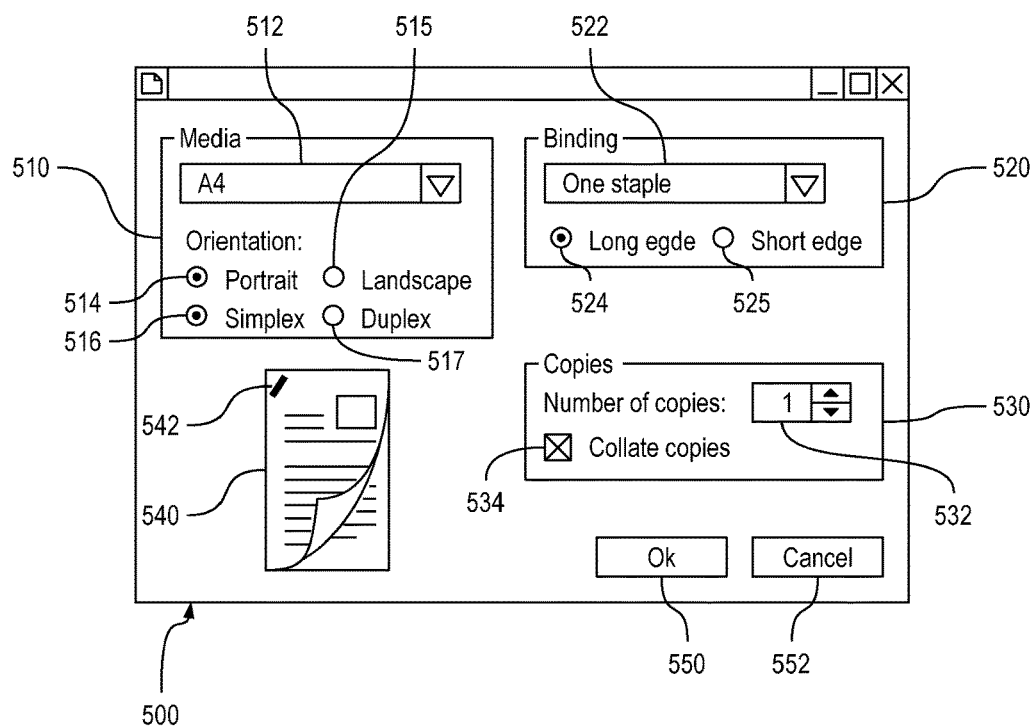
FIG. 5 is a diagram showing a typical printer driver window as generated by the invention.
Figure 8:
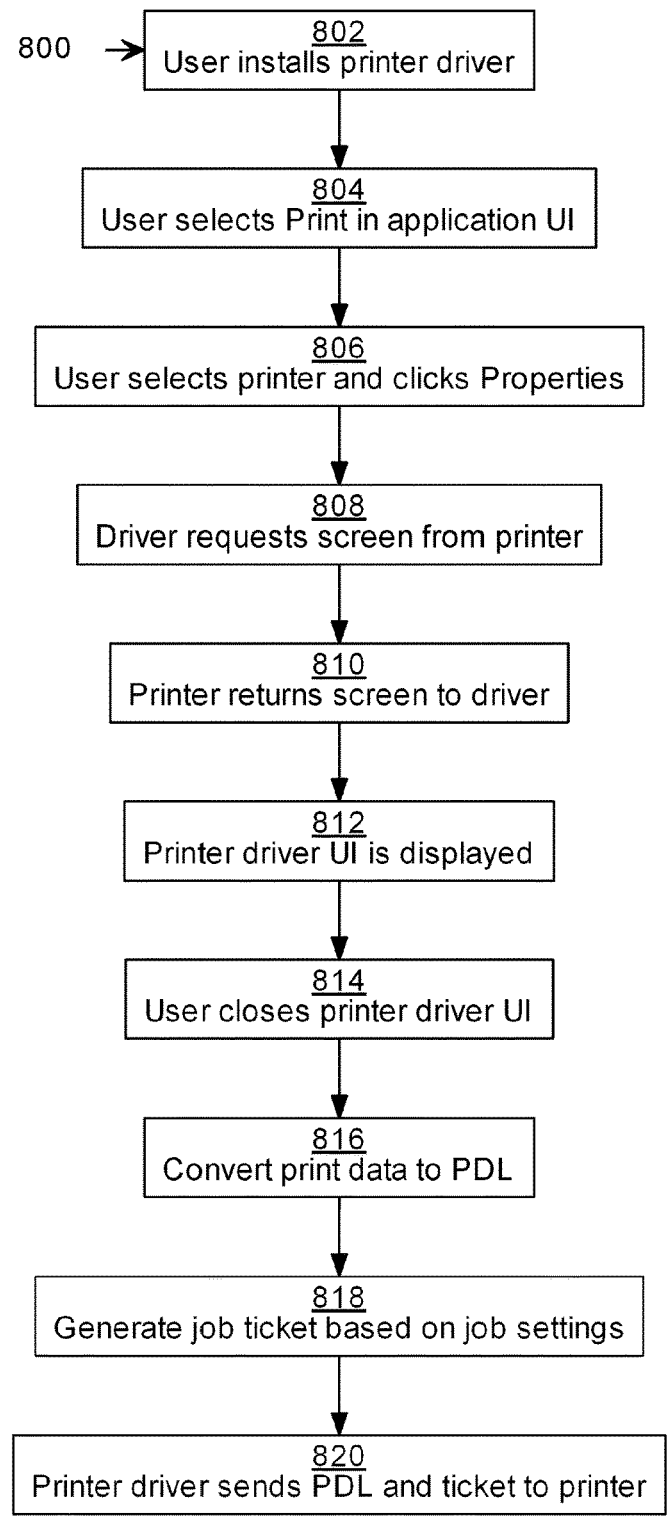
FIG. 8 is a flow diagram showing a method according to the present invention.

FIG. 8 shows a flow diagram similar to FIG. 5, but describing the flow 800 according to an embodiment of the present invention. Of course, the printer driver 332' requires an initial installation 802. After the printer driver 332' has been installed, printing to the printer 310', 320' is available from the application 331. In the application 331, the user selects 804 a Print-button or Print-command in the menu of the application's user interface. The user selects 806 the appropriate printer 310', 320' and selects a Properties-button 412 to open the printer driver window 500.

By clicking the Properties-button 412 the printer driver 332' starts executing. It will send a preliminary job ticket to the printer 310', 320'. The preliminary ticket will comprise stored default job settings or last used job settings.

The printer 310', 320' sends 810 a user interface specification to the printer driver 332', for example through a built-in web server that responds to HTTP requests 808 from the printer driver 332' and serves back HTML responses accompanied by CSS style sheets and JavaScript files through the HTTP protocol. The printer driver 332' receives the HTML, CSS, and JavaScript, and renders the printer driver user interface through the UI container 735 and displays 812 the printer driver window 500 on the display of the client device 330.

The UI container 735 acts in this particular embodiment as a web browser, retrieving web pages from a web server in the printer 310', 320'. The HTML generated at the printer 310', 320' is generated based on the capabilities and properties of the printer 310', 320'. For example, if the printer 310', 320' is equipped with a duplex loop, it is capable of processing jobs as desired as simplex job or as duplex job. Therefore, in such case, the HTML will include widgets to either select simplex 516 or duplex 517. The widget may be an input form element of the type radio button, or it may be any clickable object, the clicking of which triggers an AJAX-call to set the appropriate job setting (simplex/duplex) in the printer 310', 320'.

In the printer driver window 500 the user selects the appropriate job settings by manipulating the widgets displayed in the printer driver window 500. During the process of selecting the appropriate job settings, the job settings may be stored locally in the printer driver 332', but in a preferred embodiment, the widget manipulations cause AJAX calls that cause the job settings to be made in the printer 310', 320'. Once the user is done with the job settings and closes 814 the printer driver window 500, the printer 310', 320' sends the job settings in the form of a job ticket to the printer driver 332' if the settings were not already stored in the printer driver 332'.

Once the printer driver window 500 is closed, the print-dialog 400 of the application 331 allows for some further adjustments of some job settings. These adjustment affect the job ticket in the printer driver 332'. Once the user is satisfied and hits the print-button 450 of the print-dialog 400 of the application 331, the printer driver 332' proceeds and converts 816 the print data in the form of "draw commands" into a PDL that is understood by the printer 310', 320'. In so far the job ticket was not already generated, for example, because the job ticket was received from the printer 310', 320' and the user made no more changes in the print-dialog 400 of the application 310, the job ticket is now generated 818 from the job settings. Finally, the printer driver 332' submits the print data in PDL form with the job ticket to the printer 310', 320'.

The major advantage of the present invention is that the printer driver 332' does not depend on the printer 310', 320' capabilities and properties. There is still a dependency on the PDL, but the PDLs in use currently are all standardised and more-or-less mature and stable and changes are uncommon. Of course the dependency on the printer capabilities and properties is exchanged for a dependency on the protocol used to exchange the user interface specification, but in relation to the functionality of the printer 310', 320' this dependency is more remote and abstract and therefore less likely to change.

Prior art systems that rely on the printer 310, 320 sending a list of capabilities to the printer driver 332 also try to overcome the problem of printers 310 and printer drivers 332 not corresponding. However, this does not provide the flexibility of the present invention, as the prior art printer driver 332 is not capable of interpreting capabilities introduced after the printer driver 332 was released. Therefore, the capabilities can only be presented to the user by way of more-or-less anonymous widgets wherein the meaning of the capabilities and the selectable values is left to a user's interpretation of a string that is used to represent the capability and the values. Furthermore, any logical grouping or other relationship between different job settings is much harder to represent in the user interface.

For example, if a printer 310, 320 was originally introduced without a stapler unit, a printer driver 332 that is originally released will typically not take into account the presence of the stapler unit and will not offer stapling as a job setting. If a stapler unit is added later on, it may be possible to support the stapler without updating the prior art printer driver 332 if it was originally released with support for receiving a capabilities specification from the printer. However, the prior art printer driver 332 would not have any understanding of what the added functionality would mean and would have no possibility to represent this added functionality in any other way than representing it as "new" or "extended" functionality. The only way a user would learn what the new setting would do is through the name of the job setting, for example "staple", and its values such as "yes" and "no". For some settings that might be sufficient and at first sight for a stapler, this looks rather straightforward. However, the user might have trouble identifying where the staple will end up. For a normal text document printed on standard media size (e.g. A4) in portrait orientation, his guess will probably be correct (left top corner in western countries), however, this is not straightforward when printing in landscape orientation and on deviating media sizes. For example, on an A3 printer a landscape orientated image can be obtained on A4 media in two ways: 1) by printing a rotated image on a long-edge-first (LEF) separated sheet of A4, or 2) by printing a non-rotated image on a short-edge-first (SEF) separated sheet of A4). In these two cases the staple will end up in two different corners. In which corner the staple will end up is difficult for the user to figure out. The prior art printer driver 332 will not be able to help the user in any way, as the printer driver 332 is not aware of what the staple function does and how it interacts with the other job settings (such as orientation, selected media (LEF, SEF)).

In contrast, the present invention is able to deal with these kind of situations, as it is the printer 310', 320' itself that generates the user interface of the printer driver 332'. This means that the printer driver 332' according to the present invention can show a setting for the new feature "staple", but can also show the position of the staple in a preview image that takes all parameters into account (stapling, print orientation, media orientation in input tray, simplex/duplex), such as the preview image 540 (FIG. 5) that shows the location 542 of the staple based on the job settings. This greatly enhances the intuitiveness of the user interface of the printer driver 332'.

This enhanced intuitiveness can be realised because in the present invention, the user interface is generated at the printer 310', 320' and can therefore reflect all capabilities, properties, but also interdependence of capabilities and properties of the printer 310', 320' without updating the printer driver 332'.

The concept of the invention even allows for a unified printer driver that is capable of submitting print jobs to a wide variety of printer models. As long as the printer models support the same variant of a PDL, a single unified printer driver 332' according to the present invention is capable of driving all these printer models. The printer driver 332' is independent of the capabilities of the printer model as the specification of the user interface does not reside in the printer driver 332', but in the printers 310', 320' instead. Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A reprographic apparatus comprising:
    a reprographic engine for physically performing a reprographic task; and
    a reprographic controller configured to provide reprographic commands to the reprographic engine, the reprographic controller having a reprographic setting,
    wherein the reprographic controller comprises:
        a communication device configured to communicate with a computing device running a device driver;
        a user interface screen generator connected to the communication device, the user interface screen generator configured to generate and return a user interface screen comprising a user interface widget for setting the reprographic setting upon receiving a user interface screen request through the communication device from the device driver;
        a display configured to display messages to a user and display a graphical user interface to the user for providing commands to the reprographic apparatus,
    wherein the reprographic controller is further configured to receive from the device driver through the communication device;
        a value for the reprographic setting; and
        a reprographic task,
    wherein the reprographic controller further comprises a job processing device configured to executing the reprographic task on the reprographic engine using the received value for the reprographic setting, and
    wherein the reprographic controller includes a central processing unit (CPU).

2. The reprographic apparatus of claim 1, wherein the computing device comprises:
    a non-volatile memory having stored thereon the device driver for submitting the reprographic task to the reprographic controller;
    a communication device for communicating with the reprographic controller,
    wherein the computing device comprises:
    a display; and
    an input device for receiving user input, and
    wherein the device driver is arranged to:
        request, by means of the communication device from the reprographic controller, a screen, the screen comprising a user interface widget for setting a reprographic setting;
        in response to the request, receive the screen;
        display on the display, the screen comprising the user interface widget;
        receive, by means of the input device, a user input representing a value for the reprographic setting;
        send the value through the communication device to the reprographic controller; and
        submit the reprographic job to the reprographic controller.

3. The reprographic apparatus of claim 1, wherein a preview widget is displayed on the user interface screen.

4. The reprographic apparatus of claim 1, wherein the reprographic apparatus is a printer and the reprographic task is a print job.

5. A method for submitting a reprographic job comprising reprographic data from a computing device to a reprographic controller of a reprographic apparatus, the reprographic controller having a reprographic setting, the method comprising the steps of:
    sending a user interface screen request to the reprographic controller;
    receiving a user interface screen from the reprographic controller, the screen comprising a user interface widget for setting the reprographic setting;
    displaying the user interface screen with the widget on a display comprised in or connected to the computing device;
    receiving user input with regard to the displayed widget representing a value for the reprographic setting;
    communicating the value to the reprographic controller; and
    submitting the reprographic job to the reprographic controller,
    wherein the reprographic controller includes a central processing unit (CPU).

6. The method of claim 5, wherein the value for the reprographic setting is set in a job ticket, and
    wherein the value is communicated to the reprographic controller by sending the job ticket comprising the value to the reprographic controller.

7. A computer program product embodied on a non-transitory computer readable medium that, if executed on a processor, performs the steps of claim 6.

8. The method of claim 5, wherein the user interface screen comprises a plurality of user interface widgets for setting a plurality of reprographic settings, and the value for each reprographic setting is communicated directly to the reprographic controller upon manipulation of the corresponding widget by the user.

9. A computer program product embodied on a non-transitory computer readable medium that, if executed on a processor, performs the steps of claim 8.

10. A computer program product embodied on a non-transitory computer readable medium that, if executed on a processor, performs the steps of claim 5.

11. The method of claim 5, wherein the reprographic apparatus is a printer and the reprographic task is a print job.

12. A method for use in a reprographic controller of a reprographic apparatus having a reprographic setting, the method for providing a user interface comprising a screen through a device driver, the method comprising the steps of:
receiving, at the reprographic controller, a user interface screen request from a device driver running on a computing device;
generating via the reprographic apparatus, the user interface screen comprising the user interface widget for setting the reprographic setting;
sending the user interface screen to the device driver;
receiving a value for the reprographic setting from the device driver;
receiving a reprographic job from the device driver; and
processing the reprographic job taking into account the value for the reprographic setting,
wherein the reprographic controller includes a central processing unit (CPU).

13. The method of claim 12, wherein the value for the reprographic setting is received comprised in a job ticket.

14. A computer program product embodied on a non-transitory computer readable medium that, if executed on a processor, performs the steps of claim 13.

15. The method of claim 12 wherein the user interface screen comprises a plurality of user interface widgets for setting a plurality of reprographic settings, and the value for each reprographic setting is individually received by the reprographic controller and upon reception set in a job ticket.

16. A computer program product embodied on a non-transitory computer readable medium that, if executed on a processor, performs the steps of claim 15.

17. A computer program product embodied on a non-transitory computer readable medium that, if executed on a processor, performs the steps of claim 12.

18. The method of claim 12, wherein the reprographic apparatus is a printer and the reprographic task is a print job.

* * * * *